United States Patent [19]
Kanda et al.

[11] Patent Number: 5,894,333
[45] Date of Patent: Apr. 13, 1999

[54] REPRESENTATIVE IMAGE DISPLAY METHOD, REPRESENTATIVE IMAGE DISPLAY APPARATUS, AND MOTION IMAGE SEARCH APPRATUS EMPLOYING THE REPRESENTATIVE IMAGE DISPLAY APPARATUS

[75] Inventors: Junshiro Kanda; Hironobu Abe; Koji Wakimoto, all of Tokyo, Japan

[73] Assignee: Mitsubishi Denki Kabushiki Kaisha, Tokyo, Japan

[21] Appl. No.: 08/671,919

[22] Filed: Jun. 27, 1996

[30] Foreign Application Priority Data

Jan. 30, 1996 [JP] Japan ................... 8-014108

[51] Int. Cl.$^6$ .................................... H04N 9/74
[52] U.S. Cl. ................ 348/597; 348/564; 348/700
[58] Field of Search ..................... 348/564, 597, 348/700, 701; 382/107, 103, 173, 176, 180, 236

[56] References Cited

U.S. PATENT DOCUMENTS 5,109,425  4/1992  Lawton .................... 382/107

FOREIGN PATENT DOCUMENTS

| 0590759 | 4/1994 | European Pat. Off. . |
| 64-68084 | 3/1989 | Japan . |
| 6-339109 | 12/1994 | Japan . |

OTHER PUBLICATIONS

H. Ueda, T. Miyatake and S. Yoshizawa "Impact: Interactive Motion Picture Authoring System for Creative Talent" Inter-chi '93 Central Research Laboratory, Hitachi, Ltd. Apr. 24, 1993.

Kazuaki Tanaka, Yasuyuki Ohki and Takafumi Miyatake "Intelligent Rough Video Editing System" Hitachi Review, vol. 44, 1995, No. 3.

Shinji Abe & Yoshinobu Tonomura "Scene Retrieval Method Using Temporal Condition Changes" Systems and Computers in Japan, Jul., 1992.

Nevenka Dimitrova and Forouzan Golshani "Motion Recovery for Video Content Classification" ACM Transactions on Information Systems, Oct. 13, 1995.

*Primary Examiner*—Sherrie Hsia
*Attorney, Agent, or Firm*—Wolf, Greenfield & Sacks, P.C.

[57] ABSTRACT

A video, source, such as a VCR, plays back a motion image which is input by an image input section. Partition of scenes and creation of images representing scenes are performed by a catalog creation section. Additionally, at this time, an image representing the movement of an object appearing in the scenes is created. A representative image and a motion description image are initially stored in a catalog storage section and then displayed in catalog form by a display section under control of a display control section. Since not only the representative image of scenes but also the movement of the object in those scenes are displayed, the contents of the scenes are easily grasped.

13 Claims, 9 Drawing Sheets

REPRESENTATIVE IMAGE DISPLAY METHOD, REPRESENTATIVE IMAGE DISPLAY APPARATUS, AND MOTION IMAGE SEARCH APPRATUS EMPLOYING THE REPRESENTATIVE IMAGE DISPLAY APPARATUS

BACKGROUND OF THE INVENTION

1. Field of the Invention

The invention relates to a representative image display method and apparatus comprising of a series of multiple images into which a motion image is formed, and which displays a representative image of each scene, and to motion image search apparatus which execute searches for a motion image using the representative image display apparatus.

2. Description of Prior Art

Figure 2:
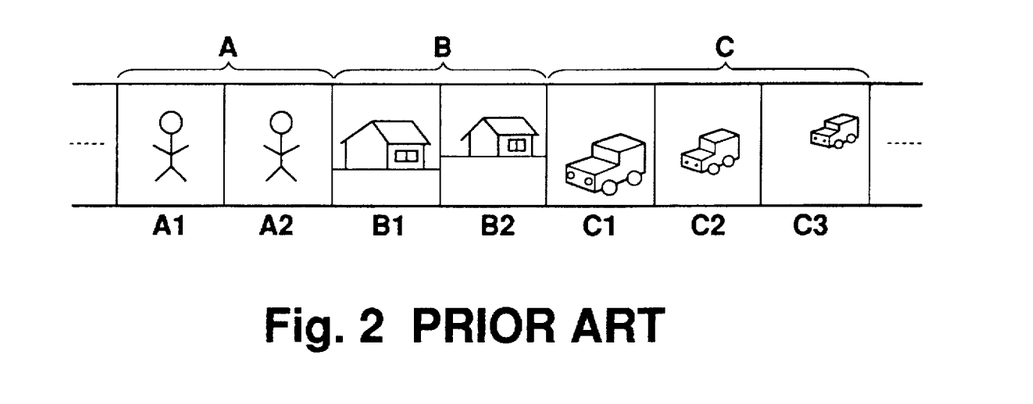
FIG. 2 exemplifies a state where three scenes have been recorded on video tape.

Generally, a motion image contains multiple scenes. Each scene has independent meaning, and is defined by a group of consecutive images. FIG. 2 shows a situation where three scenes have been recorded on a video tape. Scene A is a view of a person, scene B is of a house, and scene C is of an automobile. Each scene respectively comprises two (A1 and A2), two (B1 and B2), and three (C1–C3) images. A motion image search apparatus is used to quickly select a required scene from a motion image on recorded media, such as video tapes, when editing motion images such as those required in a multimedia presentation creation or in broadcasting. Recently, apparatus have been developed that display a representative image (hereinafter referred to as representative image) of each scene after a motion image has been partitioned into scene units, and that allow a desired scene to be selected using the representative image as an index.

Figure 3:
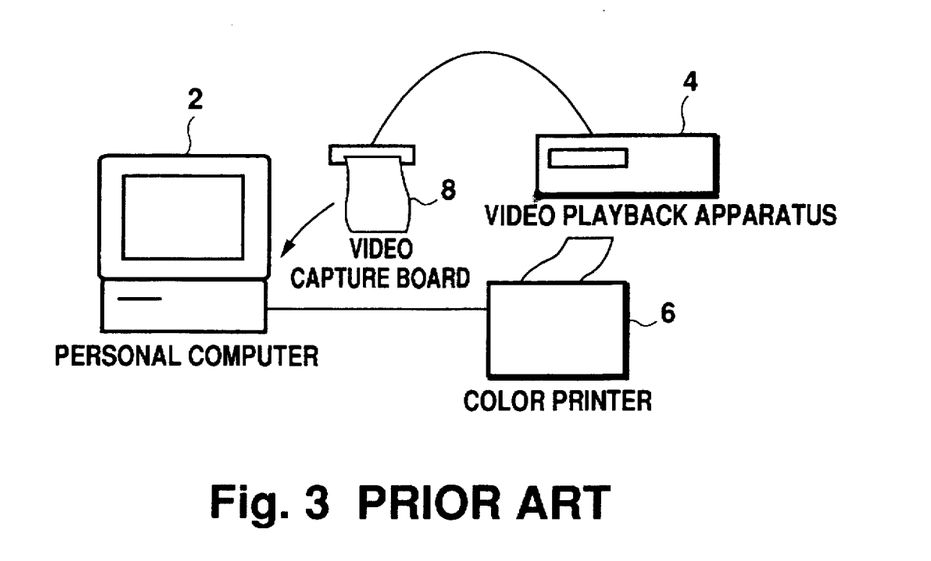
FIG. 3 is a block diagram, taken from a catalog for Mediachef/CUT, of a system using "Mediachef/CUT".

FIG. 3 is a block diagram from a catalog for "Mediachef/CUT" by Hitachi, Ltd. showing a system using the product. Details of its operation are given in "Mediachef/CUT for Windows User Operation Manual" (Windows is a registered trademark).

In the figure, the system comprises a PC 2 which performs general control, a video playback apparatus 4 which provides the motion image to the PC 2, and a color printer 6 which prints the edited images. The PC 2 contains a video capture board 8 which captures and digitizes images provided from a video playback apparatus 4. This configuration performs, for example, the following steps.

(1) First the motion image to be processed is loaded. (2) a transition point in the scene is automatically identified based on the degree of color change in the images. (3) an image is decided to be a representative image that appears immediately after the transition point is observed, and (4) the representative image is stored or printed as an index for each scene. In the case of FIG. 2, a scene transition point is identified between A2 and B1, and between B2 and C1, and the leading images of each scene, B1 and C1, become the representative images.

This system helps the user in tape editing, for example, by printing out the representative images contained in one video tape cassette in a small sheet and affixing the sheet to the side of the video tape cassette. In addition, editing processes such as sorting, deletion, and trimming of the scenes are possible on the PC 2.

In the system described above, referencing the representative images allows the user to look for desired scenes and replay them, that is, to search for a motion image. However, in representative images where a ship is afloat on the ocean, for example, the direction of the ship's movement can only be determined by replaying the motion image. If several representative images of this sort exist, for example, when searching for pictures where the ship moves to the right, the user must check each scene containing the representative image one by one. This manual search is not only laborious when there are a large number of similar representative images, but inconvenient when one tries to grasp the general movement of a motion image, and leaves much room for improvement for efficient editing.

SUMMARY OF THE INVENTION

The invention takes this problem into consideration and provides a representative image display method and apparatus, and motion image search apparatus, that enable the user to easily and intuitively grasp the contents of a motion image. The representative image display method of the invention includes a scene partition process which partitions a motion image comprising a sequence of multiple images into scenes, a representative image selection process which selects a representative image with which to represent each partitioned scene, a transition detection process which detects transitions occurring in the subject of each partitioned scene, a transition information hold process which associates and holds information concerning detected transitions for every scene with the representative image of the corresponding scene, and a display process which combines and displays the representative image of at least one scene with transition information that was associated with the representative image.

In this configuration, the motion image to be processed is first input and then partitioned into scenes. Next, a representative image is selected to represent each partitioned scene. Furthermore, at this time, changes occurring for an object within each scene are detected, and information relating to the detected transitions for each scene is held in association with the scene. Here "images" refer to elements which comprise a motion image, for example frames or MPEG pictures. Hereinafter, they will also be referred to as frames. An "object" means anything visible in the motion picture like a person. For example, in motion image, characters appearing on screen can be the objects. A "change occurring for an object" refers to, for example, a change due to movements of an object or a change in color of an object.

Next, the representative image of a scene and the transition information associated with the representative image are combined and displayed.

In accordance with the representative image display method of the invention, the contents of a motion image can be easily and intuitively grasped since information concerning changes occurring in an object is displayed in addition to a representative image.

On the other hand, the representative image display apparatus of the invention includes an image input section which inputs and stores a motion image comprising a sequence of multiple images, a scene partition section which analyzes the input motion image, detects scene transition points, and partitions the motion image into scenes, a representative image selection section which selects a proper image as the representative image from among the images comprising each scene, a change information hold section which detects changes occurring in an object within a scene, and associates and holds the information concerning the change for every scene with the representative image of the corresponding scene, and a display control section which combines and displays a representative image of at least one scene with the change information that was associated with the representative image.

In this configuration, the motion image which was input into the apparatus is first stored by the image input section. Next, the motion image is read, its scene transition points detected, and it is partitioned into scenes. Then, both a representative image of each scene is created and the information on changes occurring in an object in every scene is associated and held with the representative image of the corresponding scene. Finally, a representative image of at least one scene and the change information that was associated with the representative image are combined and displayed.

In accordance with the representative image display apparatus of the invention, an effect similar to that of the above method is obtained. Furthermore, the apparatus can be easily incorporated into the motion image search display apparatus. In one aspect of the representative image display apparatus of the invention, the changes occurring in the above object result from the movement of the object, and the above change detection section detects the movement of the object based on differences among multiple images. Naturally, the "movement of the object" may occur as a result of movement at the camera. A "difference" between images is determined, for example, by obtaining the difference in pixel values at corresponding locations. On this assumption, the apparatus further includes a motion description image creation section which creates images visually showing movement of the object, and the above display control section combines and displays the above representative image with this motion description image.

The apparatus enables the movement to be easily grasped in the object.

In another aspect the invention, the above motion description image creation section fetches, at a preset time interval, an image stored in the image input section and creates its outline image. The outline image is then superimposed onto a previously created motion description image so as to create a new motion description image, and the fetch, the creation of the outline image and the superimposition processes are repeated to create new motion description images in succession. The "preset time intervals" can be specified from an external source or can be the default value of the apparatus. In this aspect, the outline images at the various times are all shown in one image. Only the outline image that was created first may be used without change as a motion description image.

According to this aspect of the invention, it is even easier to grasp the movement.

In yet another aspect of the invention, when creating outline images at preset time intervals, the above motion description image creation section creates new motion description images while changing the colors of the outlines based on the elapsed time from a scene's start time. Here "color" includes black, white, and neutral tints (or achromatic shades).

In this aspect, not only the movement but also the direction of movement can be easily grasped.

In still another aspect of the invention, when an arbitrary time between the scene start time and end time is specified, the above display control section highlights the location of the object at the specified time in the above motion description image. Since the "location of the subject" is indicated from the outline image, one application of the aspect is to change the intensity of outline image that corresponds to the specified time.

According to this aspect, it becomes easy to grasp the location of the object at a certain time, and this can facilitate the search for the search start position. The motion image search apparatus of the invention performs searches for motion image and includes one of the above representative display apparatus, a video source which plays back and supplies a motion image to the above representative display apparatus, a video source control section which controls the playback of the motion image by the video source, and a command input section which inputs commands for search processing. In this configuration, when one scene and a playback start time from the displayed scenes are specified by the command, the video source control section follows the command and performs playback of the motion image from the above playback start time of the specified scene. The playback enables the user to confirm the search result. According to the motion image search apparatus of the invention, all the advantages of the above representative image display apparatus are obtainable and the motion image editing efficiency is greatly improved.

DESCRIPTION OF PREFERRED EMBODIMENTS

Here, preferred embodiments of a representative image display apparatus and a motion image search apparatus incorporating the representative image display apparatus are described. This description will also clarify the representative image display method of the invention. In the motion image search apparatus described in the embodiments below, a playback apparatus which plays back a video medium is included, and the playback apparatus is electrically controlled directly from a main control section in the motion image search apparatus. Although this configuration is ideal, for example, in broadcasting where relatively advanced functions are required, its applications are of course not limited thereto.

Embodiment 1

In this embodiment, an apparatus is described which creates an image showing the motion of an object in every scene and displays it together with a representative image.

Configuration

Figure 1:
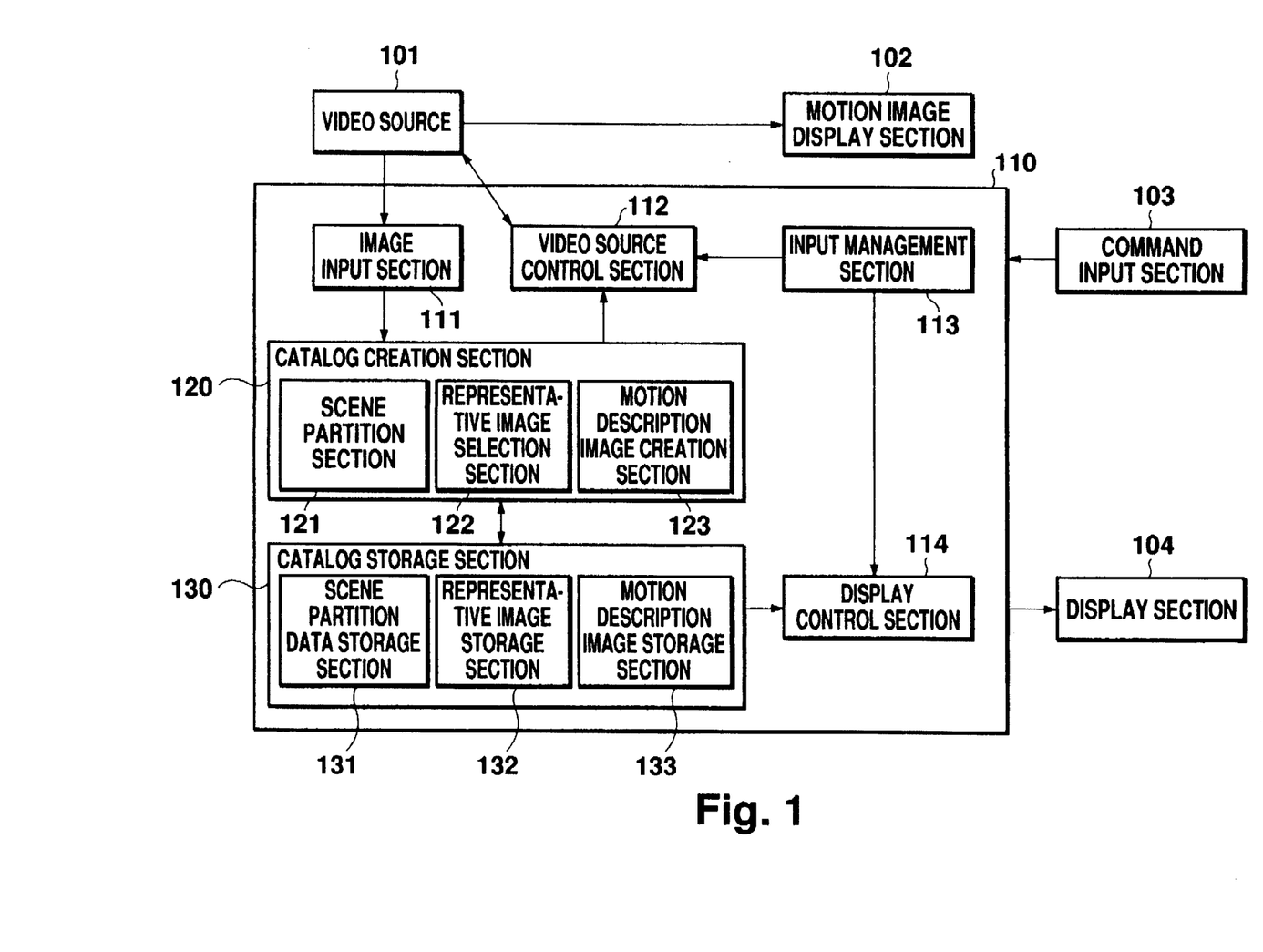
FIG. 1 is an overall block diagram of the motion image search apparatus concerning embodiment 1.

FIG. 1 is an overall block diagram of the motion image search apparatus concerning this embodiment. Since a main control section 110 controls the overall apparatus in this figure, this and a command input section 103 mentioned later correspond to the representative image display apparatus. A video source 101 plays back recorded video media such as those for VCRs and provides motion image to the main control section 110 and a motion image display section 102. The main control section 110 creates representative images and the motion description images from the provided motion image, and motion image display section 102 simply displays the provided motion image. The motion image display section 102, for example, can be a monitor which displays ordinary NTSC format signals, allowing a user to directly view the searched motion image.

A video source control section 112 controls the playback of motion image from a video source 101. It performs control functions required for the search process, such as "stop after 10 seconds from the start", in addition to the various control functions (tape rewind, fast forward, pause, and so forth) available on the front panel of home VCRs. Control signals are connected to the video source 101 by a cable. A video source control section 112 controls the playback of the motion image that is necessary for the main control section 110 to create a representative image, and necessary for the motion display section 102 to display.

The played back motion image is input by an image input section 111. Image input section 111 includes an A/D converter and a frame memory (not shown). Image input section 111 digitizes the input image, stores it into the frame memory and waits for further processing. The image input section 111 may also contain a disk storage apparatus which secondarily stores the contents of the frame memory. In this case, it becomes unnecessary to read the motion image required for processing every time from video source 101, and processing efficiency can be improved.

A catalog creation section 120 is composed of a series of software modules which read image data from the frame memory, and creates a catalog based on this data, and which comprises a scene partition section 121, a representative image selection section 122, and a motion description image creation section 123. A catalog is a list of information concerning multiple scenes. On the other hand, based on the contents of the data output from the catalog creation section 120, a catalog storage section 130 sorts and stores the data, and comprises a scene partition data storage section 131, a representative image storage section 132, and a motion description image storage section 133.

The scene partition section 121 analyzes the digitized image using known methods and partitions the motion image into scenes based on the difference between two consecutive scenes. Based on the position (for example a time code or counter value such as LTC or VITC recorded on a tape) on the medium at the partition point, the start point and end point of each scene are stored in a scene partition data storage section 131.

The representative image selection section 122 selects a certain frame from the scene as a representative image. The representative image may be a frame at the beginning, middle, or end of the scene, or a frame specified by the user. To identify the scene which the representative image represents, information such a scene number is stored into the representative image storage section 132.

Figure 4:
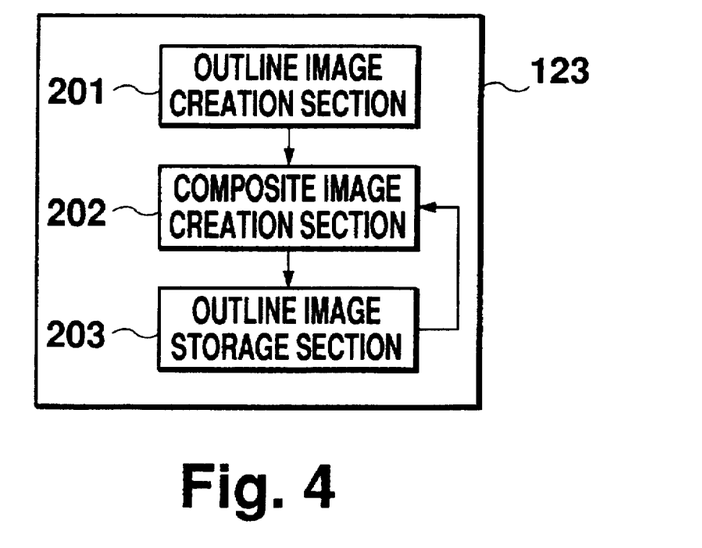
FIG. 4 is a block diagram of motion description image creation section 123 of embodiment 1.

Motion description image creation section 123 performs a distinctive process in this embodiment. FIG. 4 is a block diagram of a motion description image creation section 123. In this figure, an outline image creation section 201 processes the input image and creates an outline image. A composite image creation section 202 performs composite processing on the created outline image and an outline image storage section 203 temporarily stores the composed outline image. In this embodiment, the outline of an object included in a given image within a scene is sampled in each image, and these outlines are superimposed to create one image.

Command input section 103 permits the entry of command inputs by the user and employs a device such as a keyboard, mouse, or various pointing devices. The input command is processed by an input management section 113, which is a command dispatcher, to initiate the required action within the main control section 110.

A display control section 114 includes a system program for the display system which centrally controls the display of various images such as representative images and motion description images, and a display circuit such as a VGA controller and its driver. In the display control section, 114, the display state such as for the location of a catalog which is read from catalog storage section 130 is ultimately determined and displayed at a display section 104. The display section 104 may be an ordinary display apparatus on which representative images and motion description images are displayed.

Process Operations

The main control section 110, which receives a scene partition start instruction based on command inputs, issues a play-back instruction to the video source 101 through the video source control section 112. The motion image output from video source 101 is displayed by the motion image display section 102 and digitized in frame units by the image input section 111.

Next, each frame is sent to a catalog creation section 120. At the scene partition section 121, a histogram is taken for the input image and its preceding image, and a scene's partition point is judged when the absolute value of its difference reaches or exceeds a threshold. This method itself is known. Instead of this method, any characteristic physical parameter between consecutive images may be compared to detect the partition point. Once the partition point is ascertained, information such as a time code recorded on the video tape is acquired from the video source 101 and stored in the scene partition data storage section 131. In parallel with this, a representative image is created and stored as a still image file in the representative image storage section 132. Next, the motion description image is created.

Figure 5:
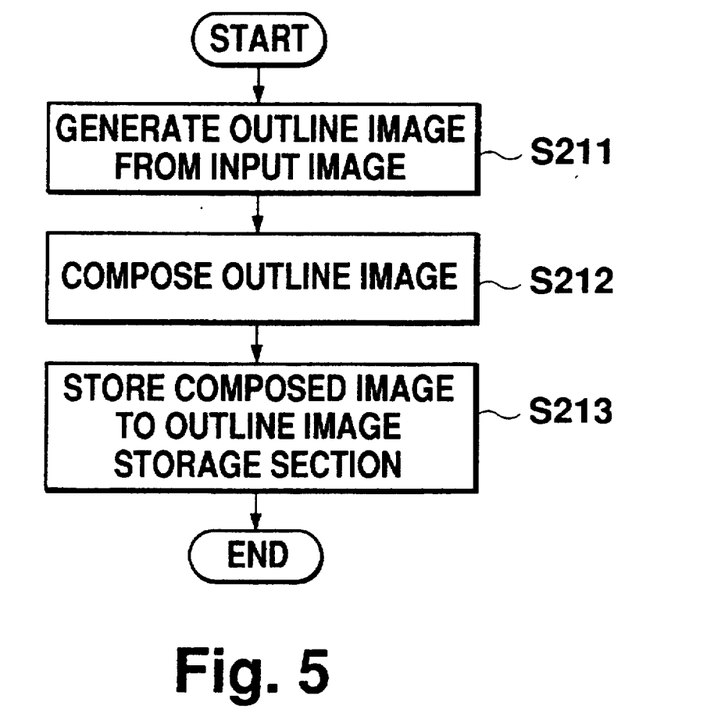
FIG. 5 is a flowchart showing the flow of processes executed by the motion description creation section 123 of embodiment 1.

FIG. 5 is a flowchart showing the flow of processes by motion description image creation section 123. According to this figure, the sent image is passed through a Compass-gradient filter in the outline image creation section 201 and an outline image is created (S211). In the outline image, each pixel takes on one of two values 0 and 1, where pixels on the outline become 1 and other pixels become 0. Outline images may be obtained at a user specified frame interval, for example, every 10 frames, or at an interval preset as a default value in the apparatus.

Next, the image which has been stored in the outline image storage section 203 is read and composed (S212) by the composite image creation section 202 with the outline image created in S211. Composing of the image is achieved by taking the logical OR of pixel values at the same coordinates for all pixels in the two images. The composite image thus created is stored (S213) in the outline image storage section 203. These processes are repeated until a scene partition point is detected. When the scene partition point is detected, the image stored in the outline image storage section 203 is transferred to and stored in the motion description image storage section 133.

Figure 6:
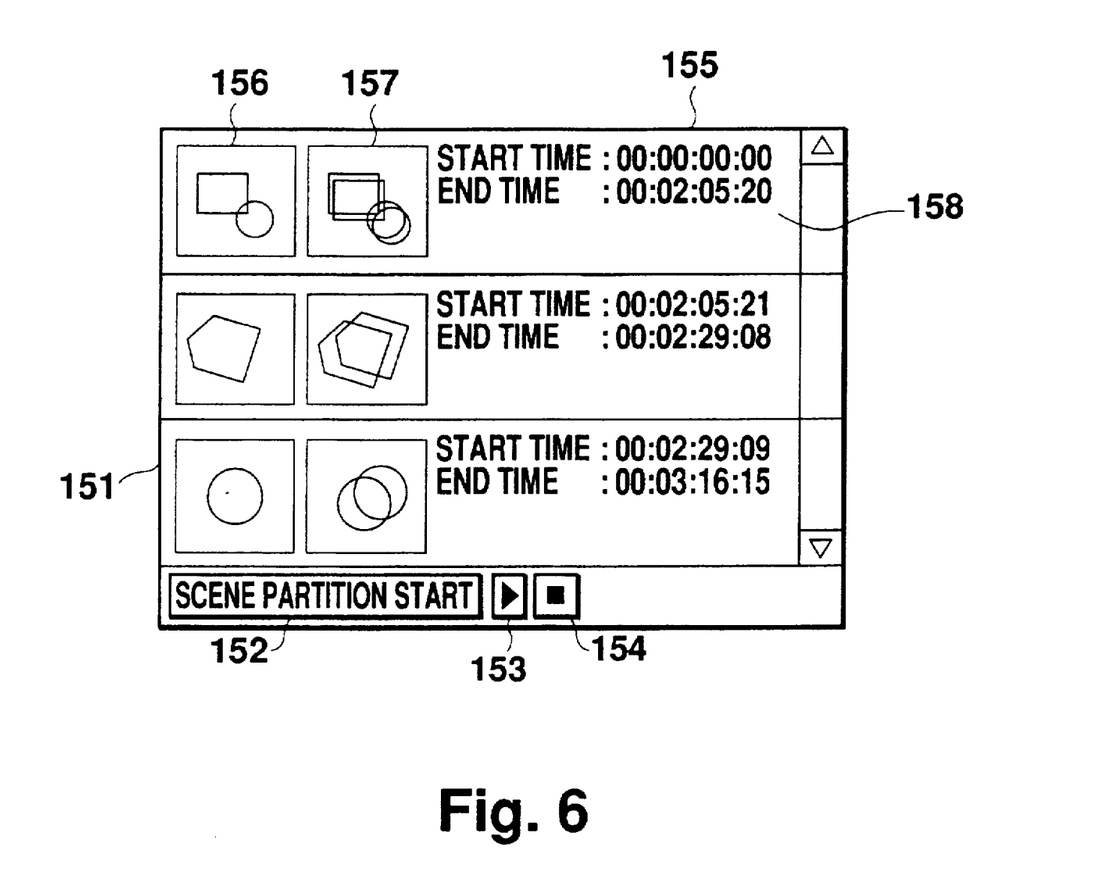
FIG. 6 shows a UI which is displayed at display section 104 of embodiment 1.
Figure 7:
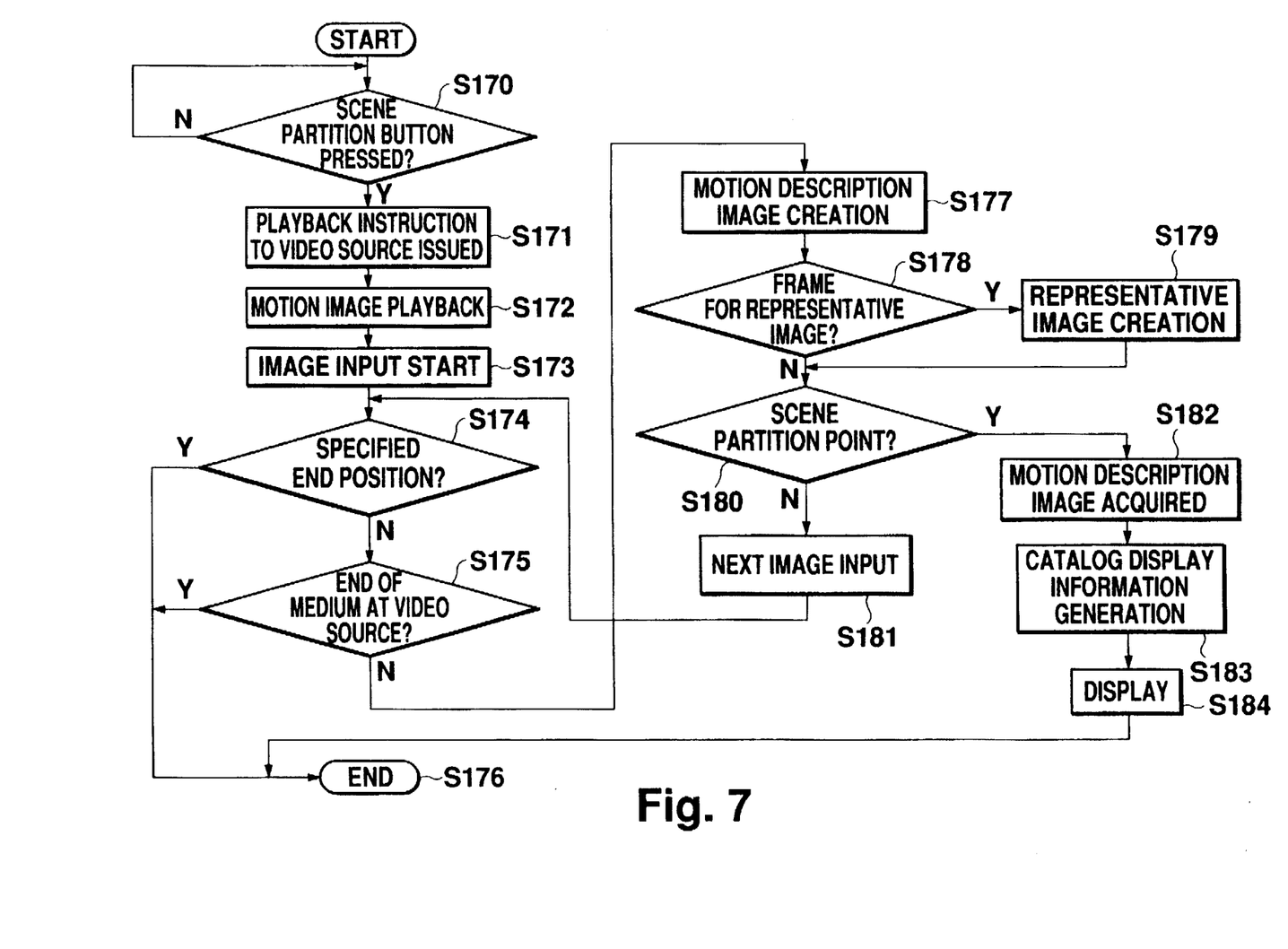
FIG. 7 is a flowchart showing the flow of processes which use the UI of FIG. 6.

Here, the above processes are described together with user input operations and actual image display examples. FIG. 6 shows a user interface (UI) displayed by the display section 104, and FIG. 7 is a flowchart showing the flow of processes using the UI. In FIG. 6, a scene partition start button 152 starts scene partition. A playback button 153 initiates playback of the motion image for the selected scene and a stop button 154 stops the motion image being played back. In FIG. 6, the entire screen above these buttons is a catalog display area 151 which is organized into 3 scene display areas 155, each corresponding to one scene. Each scene display area 155 contains a representative image display area 156 which displays the representative image of that scene, a motion description image display area 157 which displays the motion description image, and a scene partition data display area 158 which displays each scene's start point (start time) and end point (end time). The first two digits of the time display indicate the hours, followed by minutes, seconds, and frame number. The frame number for the NTSC format is from 0 to 29 since the number of frames displayed is 30 per second. When playing back a motion image, the user is allowed to specify beforehand how much to play back (that is, for how much of the motion image scene partition is to be performed). This specified amount is converted to a time code on the medium and held in the apparatus as the specified end position.

In the UI, once the user presses the scene partition start button 152, the input management section 113 interprets this command (S170) and a playback instruction (S171) is sent to the video source 101. The medium in the video source 101 is played back (S172) and the motion image is sent (S173) to the catalog creation section 120. At this time, it is judged whether the time code on the medium indicates the specified end position (S174) or the status indicates the end position (S175) of the medium, and if either is realized the process ends (S176).

If the process does not end (No at S175), an outline image for that frame is created and a motion description image is created (S177). In parallel with this, the input image is judged (S178) as to whether it should be a representative image, and a representative image is created (S179), for example, when a frame specified beforehand by the user is to be processed.

Next, it is judged (S180) whether the scene partition point is reached, and if it is, the motion description image is transferred (S182) to the motion description image storage section 132, and catalog display information is created (S183) to display (S184) scene partition data, the representative image, and the motion description image. Then the process ends. If the scene partition point is not reached, the next frame is read (S181) and the same process is repeated.

Figure 8:
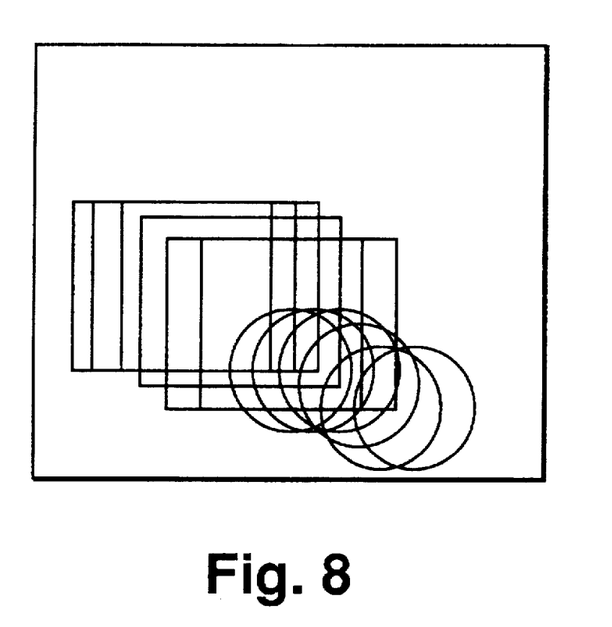
FIG. 8 is an enlargement of the motion description image display area included in FIG. 6.

From the steps above, a scene's representative image and motion description image are displayed on a display apparatus. An enlarged diagram of the motion description image display area included in FIG. 6 is shown in FIG. 8, where the movement of the object extending over multiple images is expressed consecutively in one image. As a result, the user can understand the scene in general from the representative image, and in detail from the motion description image. Based on these types of information, the user can actually view the scene by selecting it on the screen, by using a mouse, for example. As shown in FIG. 6, the selected scene has its area frame highlighted. The above buttons become effective for the selected scene. That is, the playback button 153 enables playback of the scene and the stop button 154 enables playback to be stopped. In this manner, a highly efficient motion image search is achieved. The above is an overview of the embodiment. Possible improvements and variations for this embodiment are discussed in the following.

(1) Display the motion description information as characters, symbols, and so forth.

Instead of using a motion description image, the direction of movement of the subject can be expressed using characters such as "right" and "up", or using symbols such as "→" and "↑". This can be achieved by judging the angle of the subject's movement vector. When expressing movement using characters, symbols, and so forth, the processing time and memory capacity required for the image creation can be reduced.

(2) Display the transition information other than movement When, for example, the object is a neon sign, the object itself does not move but its color changes. In this case, examining such differences as color or brightness in the object before and after the change allow information such as "becomes red", "becomes white", or "becomes bright" to be displayed as text data beside the representative image.

Embodiment 2

Although the motion description image was created in embodiment 1 by superimposing successive outline images, the superimposition in embodiment 2 is performed while varying the color of the outline image. For this reason, if the outline image concerning a subsequently input frame is displayed using a darker color, for example, it becomes easier to grasp the movement of the display.

Figure 9:
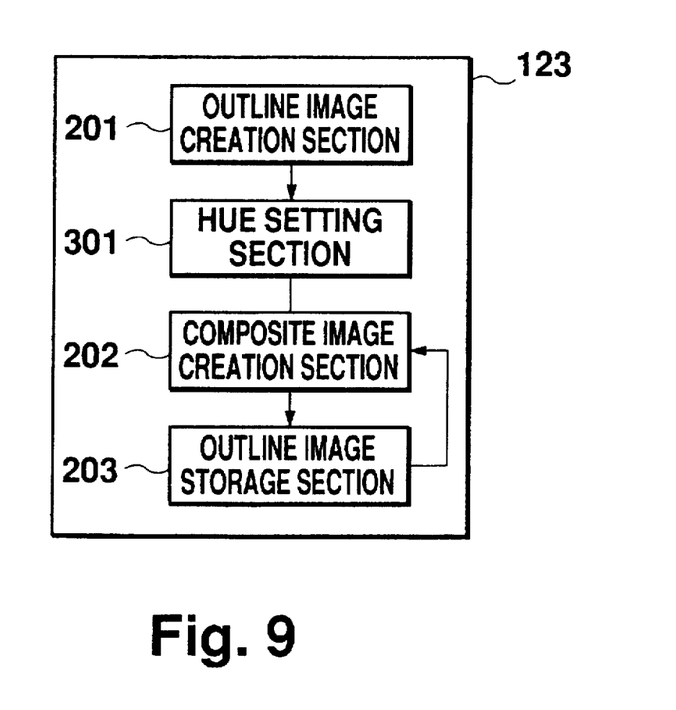
FIG. 9 is a block diagram of a motion description image creation section of embodiment 2.

FIG. 9 is a block diagram of the motion description image creation section 123 in this embodiment. The difference between this figure and FIG. 4 is that a hue setting section 301 is added. Hue setting section 301 varies the hue of the outline image with the lapse of time.

Figure 10:
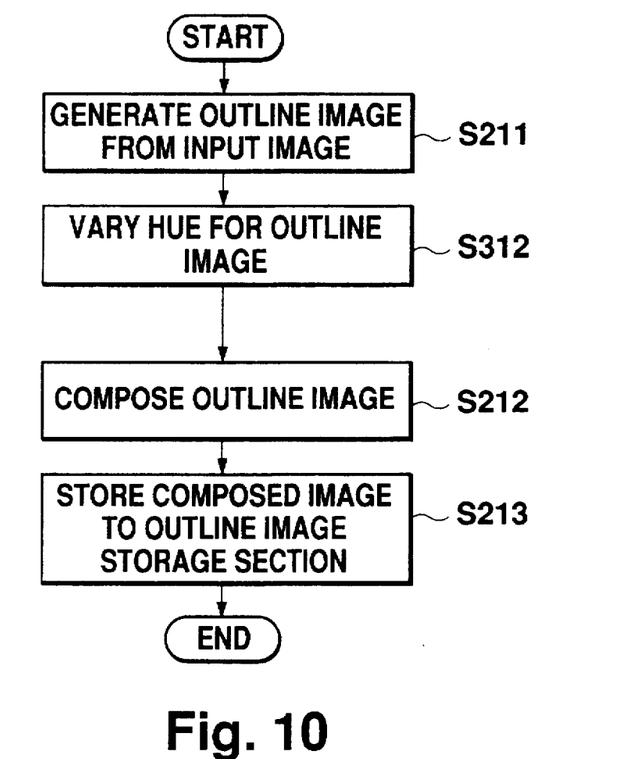
FIG. 10 is a flowchart showing the flow of processes executed by the motion description image creation section 123 of embodiment 2.
Figure 11:
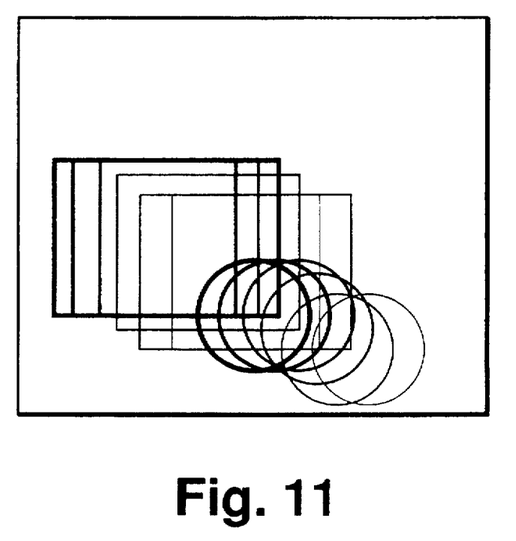
FIG. 11 shows a result obtained when the motion description image of FIG. 8 is recreated by the apparatus of embodiment 2.

FIG. 10 is a flowchart showing the flow of processes executed by the motion description image creation section 123. The difference between this figure and FIG. 5 is that S312 is inserted after S211. That is, after an outline image is created (S211), the outline's hue is varied (S312) by the hue setting section 301 with the lapse of time from the start time of the scene. After this, the process is repeated as shown in FIG. 5 and the motion description image is created. Gradation processing in which only the brightness is decreased can be employed in the processing of hue setting section 301. In this case, the outline pixel values for the outline image obtained the first time are set to a maximum value of 255 on an 8-bit gray scale and decreased by 5 at a time, for example, in subsequently input images. FIG. 11 is an image obtained as a result of re-creating the motion description image of FIG. 8 using the apparatus of this embodiment, and it becomes easier to grasp the movement of the subject.

Embodiment 3

In this embodiment, the input of an arbitrary time between the start time and end time of a scene highlights the outline image corresponding to the input time (hereinafter referred to as specified time) in the motion description image for the scene. Furthermore, the medium is actually forwarded or reversed until the position where the image corresponding to the specified time is found.

Figure 12:
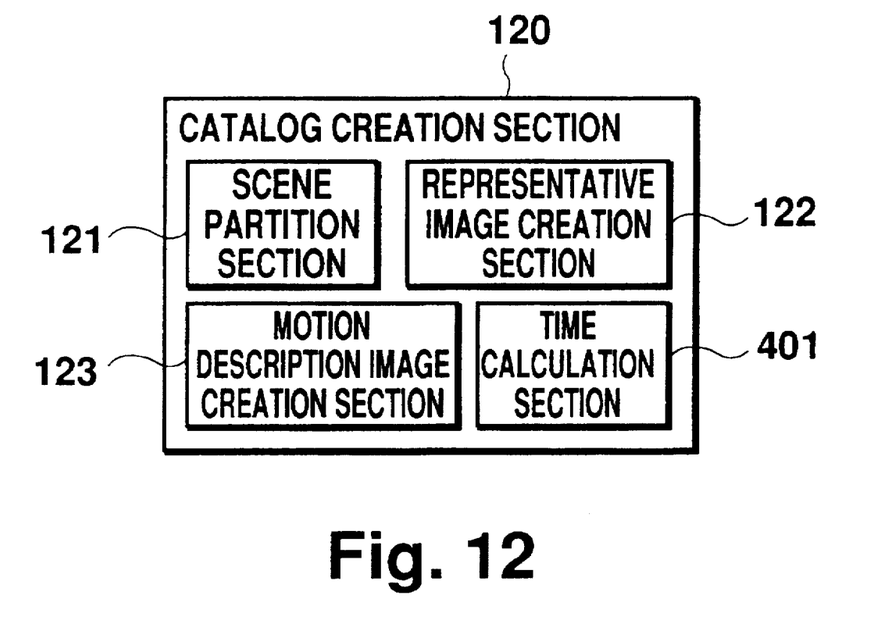
FIG. 12 is a block diagram of a catalog creation section 120 of embodiment 3.
Figure 13:
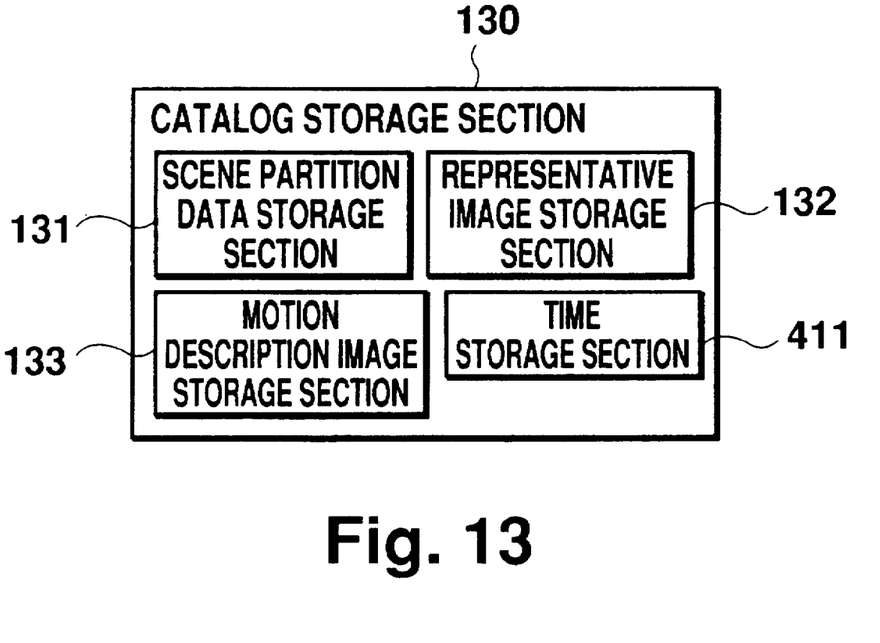
FIG. 13 is a block diagram of a catalog storage section 130 of embodiment 3.

FIG. 12 is a block diagram of a catalog creation section 120 in this embodiment and FIG. 13 is a block diagram of a catalog storage section 130. A new block added in FIG. 12 is a time calculation section 401 which obtains the amount of change in time occurring when a time button described later is pressed after the specified time was input for a scene. On the other hand, a new block in FIG. 13 is a time storage section 411 which stores, for every scene, the time calculated by the time calculation section 401. The time storage section 411 is a buffer which can store at least one time value for every scene, and is useful when a search temporarily moves to another scene and then returns back to the original scene, so that the user can determine which image had been referenced previously.

Figure 14:
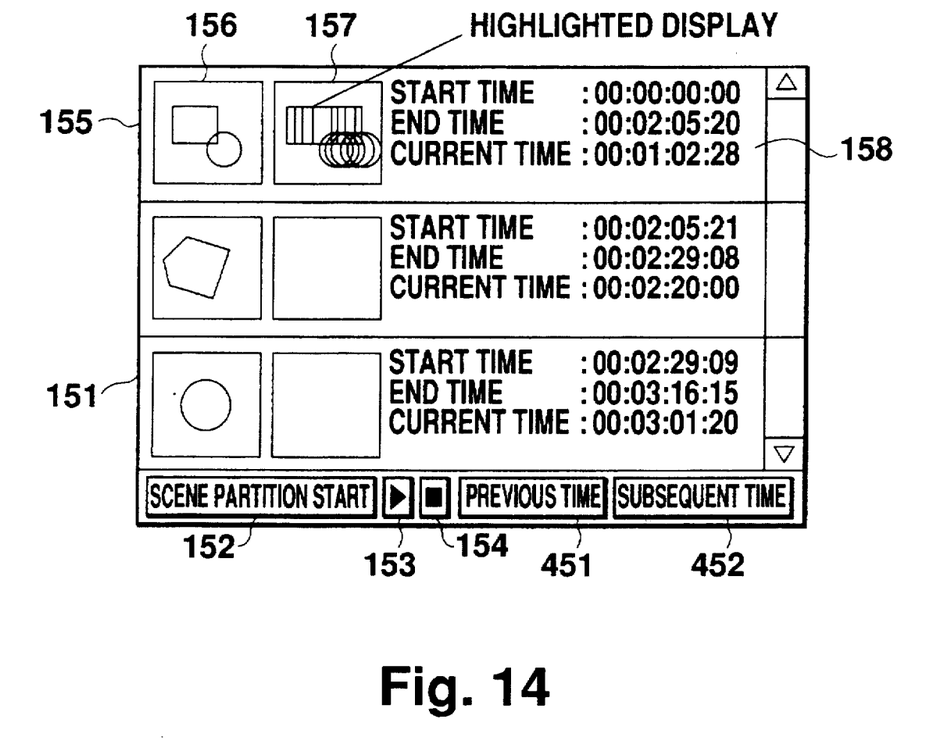
FIG. 14 shows the UI which is displayed at display section 104 of embodiment 3.

FIG. 14 shows the UI displayed by the display section 104. The difference between this figure and FIG. 6 is that a display of "current time" is newly added. When a specified time is input, the current time is initialized with this value. Subsequently, every time a time button is pressed, the current time increases or decreases. Time buttons comprise a previous time button 451 which specifies a previous time and a subsequent time button 452 which specifies a subsequent time.

Using the configuration above, the user first selects a scene. Here, the topmost scene is selected. Next, the specified time is entered, for example, through a keyboard. In the figure, the allowable input is in the range of scene start time 00:00:00:00 to end time 00:02:05:20. For example, when 00:01:02:28 is specified, the outline image with the closest time is highlighted. Images are input in 1/30 second units, and when an outline image is created for every image, for example, the time corresponding to the outline image (called an outline image time) takes on a discrete value in 1/15 second units. For this reason, the specified time and the outline image time usually do not match exactly, so the closest time is selected. The selected outline image time is stored in a time storage section 411.

In this embodiment, along with highlighting the outline image, the playback position of the actual medium is forwarded or rewound to the outline image time. Thus, the object on the medium appears at the position of the highlighted outline image. As a result, the user can see where the object is located at the specified time, and if playback from that position is desired, this can be achieved simply by issuing a playback instruction.

When the position at the specified time is different from where playback is to start, the above time buttons are pressed. The pressing of the button is judged by the input management section 113 and a new current time is calculated by the time calculation section 401. Since the outline image time takes on a discrete value in 1/15 second units, the current time increases or decreases by 1/15 second each time the button is pressed, and the outline image adjacent to the currently highlighted outline image is highlighted. The playback position on the medium is also precisely adjusted. The contents of time storage section 411 are updated with the new current time. From the processes above, it becomes possible to set the start position of playback with extremely high precision. If the subsequent time button 452 is pressed at the final outline image time of the scene, or conversely, if the previous time button 451 is pressed at the initial outline image time, these instructions will be ignored.

In this embodiment, it is necessary to consider that the motion description image is only one image. That is, once this image is created, it becomes necessary to add information to the motion description image regarding which outline corresponds to what time. For this reason, (1) motion description images having differing levels of brightness according to preset times are created using the method of embodiment 2, (2) the correspondence between the various levels of brightness and times is established, (3) the pixels having the brightness corresponding to the current time are scanned in the motion description image, and (4) all matching pixels are highlighted. The result of these steps is that only the desired outline stands out.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A representative image display method comprising:
   a scene partition process for partitioning into scenes a motion image comprising a sequence of multiple images,
   a representative image selection process for selecting a representative image to represent each partitioned scene,
   a change detection process for detecting changes occurring in an object within each partitioned scene,
   a change information hold process for associating and holding information related to the detected changes for each scene with the representative image of each scene, and
   a display process for combining and displaying, for at least one scene, the representative image of each scene with the change information associated with each scene.

2. A representative image display apparatus comprising:
   an image input section for inputting and storing a motion image comprising a sequence of multiple images,
   a scene partition section for analyzing the input motion image, detecting transition points in the multiple images, and partitioning the motion image into scenes,
   a representative image selection section for selecting a proper image from the motion image comprising multiple scenes and setting the proper image as a representative image,
   a change information hold section for detecting change occurring in an object in each scene and associating and holding the change information for each scene with the representative image of each scene, and
   a display control section for combining and displaying, for at least one scene, the representative image of each scene with the change information associated with each scene.

3. The representative image display apparatus according to claim 2, wherein changes occurring in the object are caused by movement of the object, and the change information hold section detects the movement of the object based on a difference among a plurality of images, and the display control section displays text which indicates the movement of the object included in the images when the display control section displays the representative image.

4. The representative image display apparatus according to claim 2, wherein changes occurring in the object are caused by movement of the object, and the change information hold section detects the movement of the object based on a difference among a plurality of images, further including a motion description image creation section that creates a motion description image visually showing the movement of the object, and the display control section combines and displays the representative image and the motion description image.

5. The representative image display apparatus according to claim 2, wherein a transition information section performs histogram processing and obtains a difference among a plurality of images.

6. The representative image display apparatus according to claim 4, wherein said motion description image creation section fetches, at a preset time interval, the motion image stored in the image input section and creates an outline image, and superimposes the outline image onto a previously created motion description image to repeatedly create a new motion description image.

7. The representative image display apparatus according to claim 6, wherein said motion description image creation section creates new motion description images while changing colors of the outline image based on an elapsed time from the start of each scene.

8. The representative image display apparatus according to claim 7, wherein said motion description image creation section creates the new motion description images while performing gradation processing.

9. The representative image display apparatus according to claim 4, wherein said display control section highlights the location of the object in the motion description image at a given time specified between the start time and end time of each scene.

10. The representative image display apparatus according to claim 9, wherein said display control section scans for pixels having a color corresponding to the given time, and highlights the location of the object in the motion description image by changing the color of all the pixels found by scanning.

11. The representative image display apparatus according to claim 9, wherein said display control section highlights the location of the object by changing the intensity of the object.

12. The representative image display apparatus according to claim 2, wherein changes occurring in the object are changes in color of the object, and the change information hold section detects a change in color of the object based on differences among a plurality of images and the display control section displays text which indicates the change in color of the object when said display control section displays the representative image.

13. A motion image search apparatus for performing searches for a motion image, comprising:

a representative image display apparatus including:

an image input section for inputting and storing a motion image comprising a sequence of multiple images;

a scene partition section for analyzing the input motion image, detecting transition points in the multiple images, and partitioning the motion image into scenes;

a representative image selection section for selecting a proper image from the motion image comprising multiple scenes and setting the proper image as a representative image;

a change information hold section for detecting change occurring in an object in each scene and associating and holding the change information for each scene with the representative image of each scene; and a display control section for combining and displaying, for at least one scene, the representative image of each scene with the change information associated with each scene;

a video source for playing back and supplying the motion image to the representative image display apparatus, a video source control section for controlling the playback of the motion image from the video source, and a command input section for inputting commands for search processing, wherein the video source control section performs, when one scene from displayed scenes and a playback start time for the scene are specified by a command, playback of the motion image from the playback start time of the scene based on the command.

* * * * *